S. L. ALLEN, DEC'D.
S. H., E. R., S. J. AND C. J. ALLEN, EXECUTORS.
SEED SOWING DEVICE.
APPLICATION FILED DEC. 15, 1919.
1,387,436.
Patented Aug. 9, 1921.
3 SHEETS—SHEET 1.
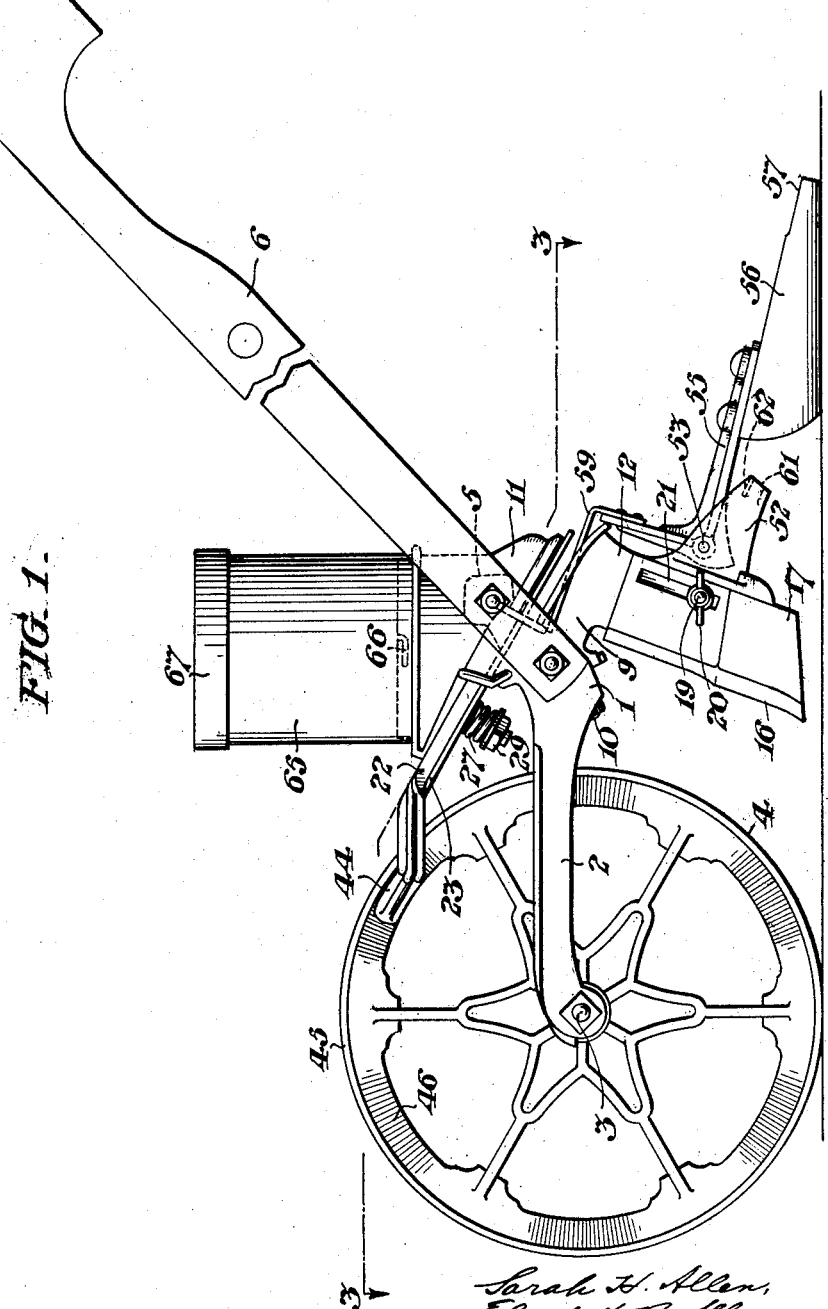

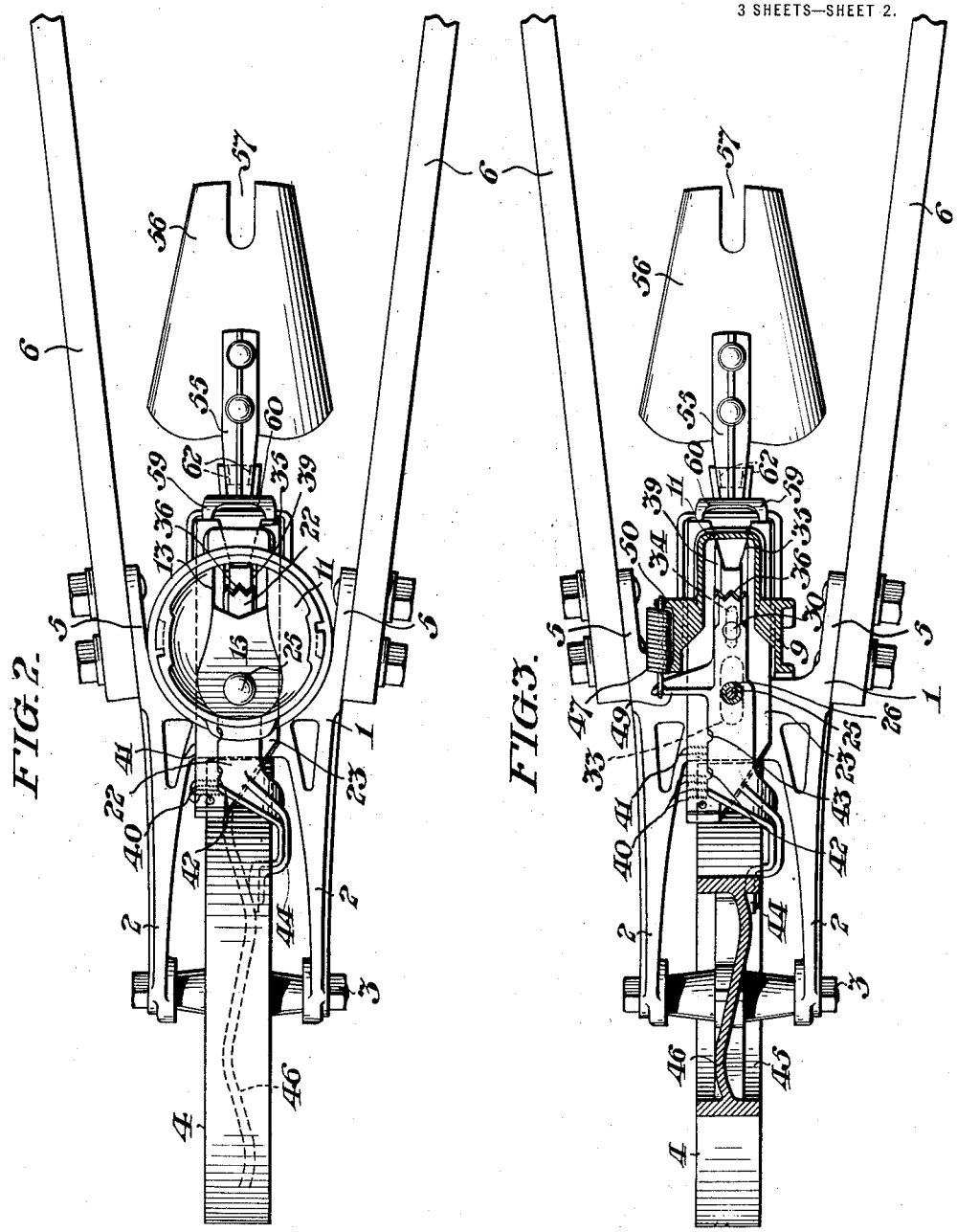

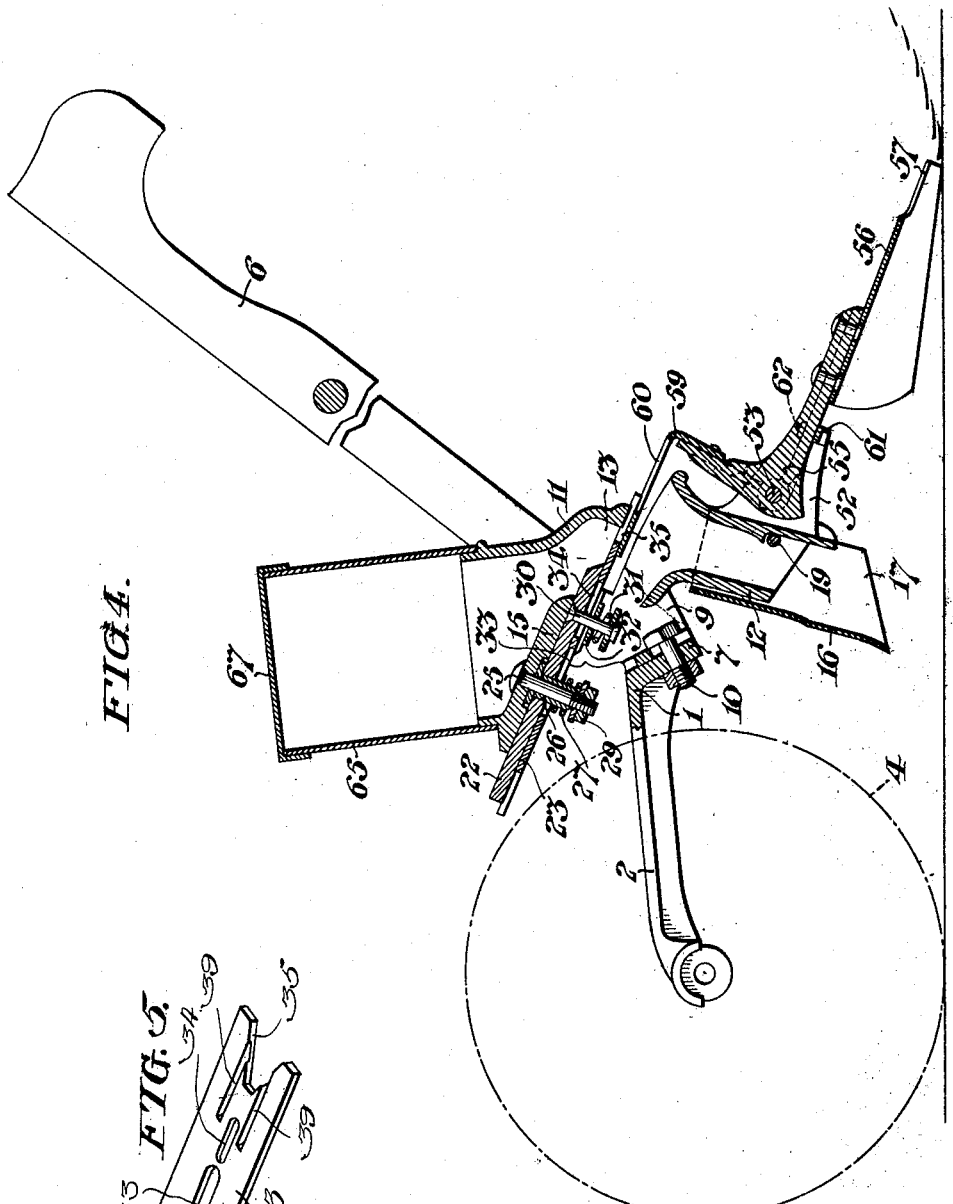

UNITED STATES PATENT OFFICE.

SAMUEL L. ALLEN, DECEASED, LATE OF MOORESTOWN, NEW JERSEY, BY SARAH H. ALLEN, ELIZABETH R. ALLEN, SUSAN J. ALLEN, AND CHARLES J. ALLEN, EXECUTORS, OF MOORESTOWN, NEW JERSEY.

SEED-SOWING DEVICE.

1,387,436.  Specification of Letters Patent.  Patented Aug. 9, 1921.

Original application filed March 29, 1916, Serial No. 87,385. Divided and this application filed December 15, 1919. Serial No. 345,010.

*To all whom it may concern:*

Be it known that SAMUEL L. ALLEN, deceased, late a citizen of the United States, residing in Moorestown, in the county of Burlington and State of New Jersey, was the inventor of certain new and useful Improvements in Seed-Sowing Devices, whereof the following is a specification, reference being had to the accompanying drawings, this application being a division of the pending application of the said SAMUEL L. ALLEN, deceased, Serial No. 87,385, filed March 29, 1916.

The invention relates particularly to that class of seed sowing devices that are automatically actuated by the rotation of the carrying wheel, and is directed especially to the mechanism for effecting the discharge of the seed.

Among the principal objects of the invention are to provide a seed sowing device which combines simplicity and durability with efficiency in the free and uniform distribution of seeds.

Other objects of the invention are to provide a seed sowing device which may be readily and conveniently adapted to sow different kinds and sizes of seeds, and to provide means actuated by the operating handles to close the outlet through which the seeds are discharged.

The invention further comprehends a seed sowing device having novel means for agitating the seed in the container or hopper, and having a carrier wheel provided with an undulated surface arranged to effect the actuation of said agitating means.

Generally stated the form of the invention as hereinafter described comprises a hopper having a discharge outlet, a wheel carrying said hopper and having a laterally undulated rim flange, a pivoted agitating plate having one end arranged to ride upon said undulated flange, and the other end bifurcated and arranged to oscillate across said outlet, a pivoted lever carrying a coverer blade, and having a plate arranged to close said outlet and hold said agitator inoperative.

The invention further includes all of the other variously novel objects and features of construction and arrangement hereinafter more definitely specified.

In the accompanying drawings, Figure 1 is a side elevational view of a seed sowing device constructed in accordance with the invention, showing the parts in position to discharge seed from the hopper; Fig. 2 is a plan view of the structure as shown in Fig. 1; Fig. 3 is a plan sectional view of the structure as shown in Figs. 1 and 2, taken on the line 3—3 in Fig. 1; Fig. 4 is a central vertical longitudinal sectional view of said device, showing the parts locked in position to close the discharge outlet of the hopper and Fig. 5 is a fragmentary perspective view of a detail of the device.

In said figures the frame 1 having the forwardly extending substantially parallel arms 2, through which the shaft 3 of the carrier wheel 4 extends, and having the rearwardly diverging arms 5 extending obliquely upward, to which the operating handles 6 are adjustably engaged, is provided with the rearwardly inclined oblique downwardly extending flange 7 to which the hopper casting 9 is adjustably secured by the bolt 10.

The hopper casting 9 comprises the hopper 11 and the inclined spout 12, the latter being disposed beneath the discharge outlet 13 in the inclined bottom wall 15 of said hopper, and carrying the drill plow 16, which is open at the back and has the substantially parallel sides 17 curvedly connected at the front and which embraces said spout, being secured thereto by the bolt 19 and winged nut 20, and, as best shown in Fig. 1, having the slots 21 through which said bolt 19 extends so as to permit its longitudinal adjustment with respect to the ground plane.

As best shown in Figs. 1 and 4, the bottom wall 15 and the perimetral edges of the hopper which embrace the outlet 13 respectively form seats, inclined rearwardly toward the ground plane, for the agitator blade or plate 22 and the seed distributing plate 23, which is adjustably carried thereby.

The blade 22 and plate 23 are pivotally carried by the bottom wall 15 upon a pintle comprising the bolt 25 and bushing 26, the latter having a flange embedded in a suitable recess in said bottom wall as best shown in Fig. 4, said blade and plate being held under tension by the tension spring 27 surrounding said bushing and adjustably held in place by the nut 29.

The plate 23 is further engaged under tension with the blade 22 by the rivet 30, which carries a tension spring 31 tending to thrust a washer 32 against said plate 23 as clearly shown in Fig. 4. Said plate 23 is provided with slots 33 and 34 through which the bolt 25 and rivet 30 extend so as to be adjustable longitudinally to vary the size of the discharge outlet 13, whose effective area is governed by an opening 35 in the rear end of said plate, the opening being preferably substantially V-shaped, as shown in Figs. 2 and 3.

In order to insure adequate agitation of the seeds in the hopper to effect their proper and uniform discharge, the rear end of the blade 22 is provided with serrations or teeth 36 and the upper surface of the plate 23 may be provided with longitudinally extended grooves 39 as shown in Figs. 2 and 3.

The plate 23 is provided with an index to indicate its proper position to provide an outlet of suitable size for the discharge of different sizes, forms and kinds of seed to be sown, which index may comprise the names of the different seeds fixed at suitably disposed distances as shown at 40 and 41, and having corresponding graduations arranged to register with the notches 42 and 43 in the edge of the blade 22 as shown in Figs. 2 and 3.

It may be here noted that certain seeds of different kinds may require substantially the same discharge outlet area and, therefore, in order to avoid confusion, separate indexes are provided which register with different notches in the blade, and it will of course, be understood that although only two groups of seed names 40 and 41 and two corresponding notches 42 and 43 are shown, any desired number may be employed.

As shown in Figs. 1, 2 and 3, the blade 22 is extended forwardly and bent laterally so as to freely pass the tread rim 45 of the wheel 4, and is provided with a curved faced shoe 44, slidably pressed into operative engagement with the laterally undulating rim flange 46 as best shown in Fig. 3, by a spring 47 connecting an arm 49 on the blade 22 and a bracket 50 on the hopper 11 and tending to draw the former toward the latter.

The spout 12 is provided with a hollow bracket 52 extended rearwardly, between the side walls of which is pivoted on the pintle 53, the bell crank lever 55, carrying upon its rearwardly extending arm a coverer blade or tool 56, formed preferably of sheet metal, arched with depending sides, which converge slightly toward the rear, and said tool is provided with a central slot 57 extending forwardly from its rear edge and arranged to leave a trail of loose soil in the center of the ridge formed by the converging depending sides, so that the sprouts from the seed may emerge without difficulty.

The upwardly extended arm of the bell crank lever 55 carries an L-shaped closure plate 59 arranged to close the discharge outlet 13 when the handles 6 are raised as shown in Fig. 4, as when the machine is at rest or being loaded, and said plate 59 is provided with an aperture 60 through which the seed may fall from the hopper to the spout when the handles are lowered and the machine is in its operative position as shown in Figs. 1, 2 and 3.

The bracket 52 has a transverse web 61 serving as a stop or rest for the bell crank lever 55, and is provided with opposed lugs 62 extending from the respective side walls and forming a lock for said bell crank lever when in the position shown in Fig. 4, the distance between said lugs being normally less than the width of the arm of said bell crank lever, but, by reason of the yielding tendency of the bracket wall, said lugs may be forced apart to pass said lever arm.

The hopper 11 may be provided with any convenient form of seed magazine such, for instance, as shown in Figs. 1 and 4 comprising the cylindrical shell 65, removably engaged with said hopper by the bayonet catch 66, and having the removable cover 67 to facilitate the convenient recharging of said magazine.

Although a coverer of particular form and construction has been described herein and illustrated in the drawings, it is to be understood that other forms of tools, such for instance, as a rake, a hoe, a plow or what not, may be substituted therefor as desired.

Moreover, while but a single form or embodiment of the invention has been described herein and shown in the drawings, it is not thereby intended or desired to limit the scope of the invention to the precise details of construction and arrangement herein set forth, as various changes and modifications may be made therein without departing from the essential features and spirit and scope of the invention as defined in the appended claims.

Having thus described the invention, that which is claimed and which it is desired to protect by Letters Patent of the United States is:

1. In a seed sowing device, the combination with a hopper having a discharge outlet, of a serrated agitator movable laterally across said outlet.

2. In a seed sowing device, the combination with a hopper having a discharge outlet, of a serrated agitator pivoted for lateral oscillation across said outlet.

3. In a seed sowing device, the combination with a seed hopper having an inclined bottom provided with a discharge outlet and affording an inclined seat, a plate movable in said seat and having an opening for controlling said outlet, means to oscillate said plate laterally across said outlet, a pivoted lever, and a gate carried by said lever arranged to close said outlet and tend to hold said plate from movement when said lever is in the locking position.

4. In a seed sowing device, the combination with a seed hopper having an inclined bottom provided with a discharge outlet and affording an inclined seat, a plate movable on said seat and having an opening for controlling said outlet, means to move said plate across said outlet, a pivoted lever, a gate carried by said lever arranged to close said outlet and tending to hold said plate from movement when said lever is in the locking position, and means to retain said lever in said locking position.

5. In a seed sowing device, the combination with a seed hopper having an inclined bottom provided with a discharge outlet and having a spout disposed below said outlet, a plate pivoted to said bottom adjustable longitudinally thereof and having an opening communicating with said outlet and arranged to vary its effective area by the longitudinal adjustment of said plate.

6. In a seed sowing device the combination with a hopper having an outlet, an agitator blade movable across said outlet and having indicating means thereon, a plate longitudinally adjustable with respect to said blade provided with an opening arranged to vary the effective area of said outlet and provided with symbols arranged to be registered with said indicating means by the adjustment of said plate to determine the size of the area of said outlet required for the different kinds and sizes of the seeds to be sown.

7. In a seed sowing device the combination with a seed hopper having an outlet, of an inclined oscillatory seeding plate having a bifurcated end arranged to move beneath said outlet and having grooves extending longitudinally thereof, and means to oscillate said plate.

8. In a seed sowing device the combination with a seed hopper having an outlet, of an inclined oscillatory seeding plate having grooves extending longitudinally thereof and having a bifurcated end arranged to move beneath said outlet, an agitator blade movable therewith and having serrations engaging the seed in said hopper, means to effect the movement of said plate and means to oscillate said plate.

9. In a seed sowing device the combination with a seed hopper having an outlet, of an inclined oscillatory seeding plate having a bifurcated end arranged to move beneath said outlet and means to oscillate said plate.

10. In a seed sowing device the combination with a seed hopper having an outlet, of an inclined oscillatory seeding plate having a bifurcated end arranged to move beneath said outlet, an agitator blade movable therewith and having serrations engaging the seed in said hopper, means to effect adjustment of said plate and means to oscillate said plate.

In witness whereof, we, the undersigned, executors of the last will and testament of SAMUEL L. ALLEN, deceased, have hereunto set our hands this 11th day of December, A. D., 1919.

SARAH H. ALLEN,
ELIZABETH R. ALLEN,
SUSAN J. ALLEN,
CHARLES J. ALLEN,
*Executors of Samuel L. Allen, deceased.*